No. 854,773. PATENTED MAY 28, 1907.
J. B. TAYLOR.
EQUALIZING LOADS ON MOTOR GENERATOR SETS.
APPLICATION FILED OCT. 11, 1904.
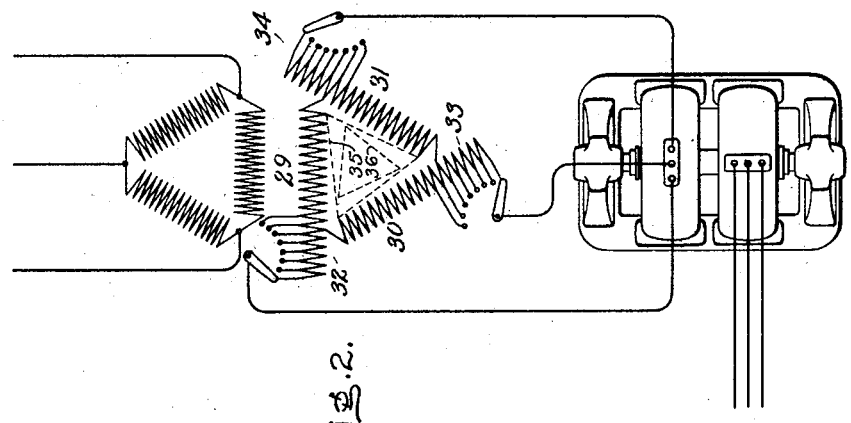
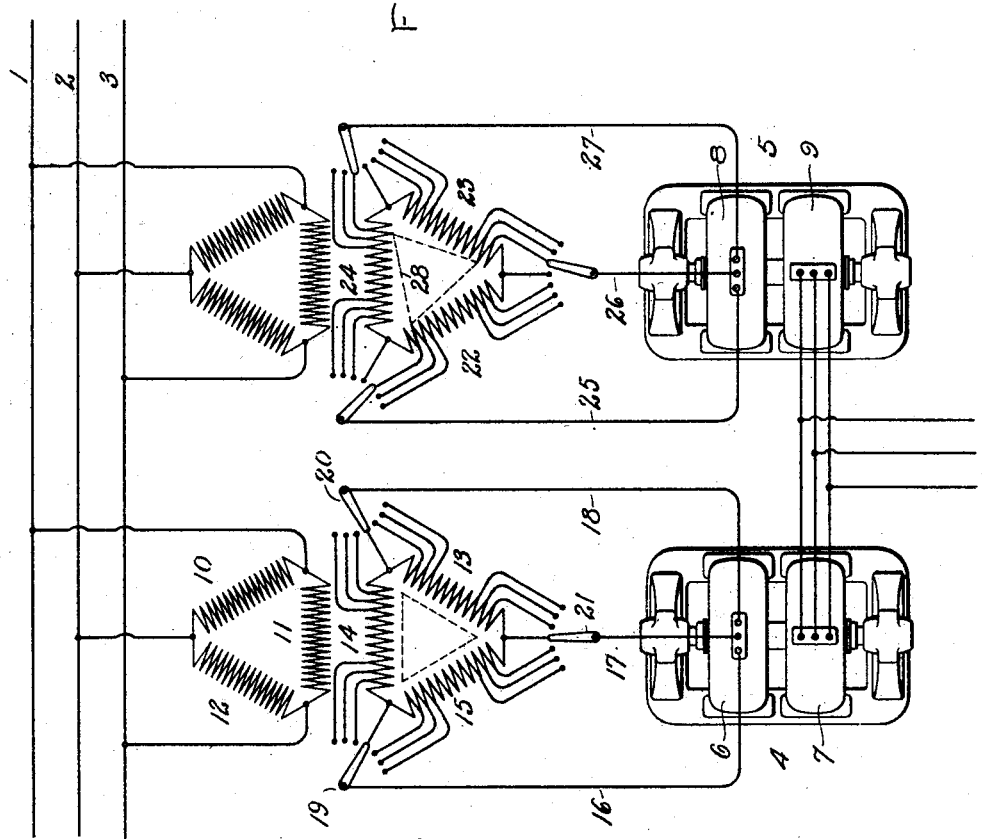
WITNESSES:
George A. Thornton
Helen A. Ford
INVENTOR:
John B. Taylor,
By Albert G. Davis
Att'y.

UNITED STATES PATENT OFFICE.

JOHN B. TAYLOR, OF SCHENECTADY, NEW YORK, ASSIGNOR TO GENERAL ELECTRIC COMPANY, A CORPORATION OF NEW YORK.

EQUALIZING LOADS ON MOTOR-GENERATOR SETS.

No. 854,773.

Specification of Letters Patent.

Patented May 28, 1907.

Application filed October 11, 1904. Serial No. 228,067.

*To all whom it may concern:*

Be it known that I, JOHN B. TAYLOR, a citizen of the United States, residing at Schenectady, county of Schenectady, State of New York, have invented certain new and useful Improvements in Equalizing Loads on Motor-Generator Sets, of which the following is a specification.

When a motor generator set consisting of an alternating current generator and a synchronous motor is run in multiple on both sides with another set of the same construction, considerable difficulty is frequently experienced in equalizing or adjusting the portion of the load carried by one set with that carried by the other. This is due to different characteristics of machines of different sizes, also to mechanical difficulties in constructing the machine so as to obtain the same relative positions between the stationary and moving parts of the motor generators of the two sets. For instance, when the motors of the two sets are running from the same mains, the generators being separated, the electromotive force wave of one generator may be slightly in advance of the other, so that when connected in multiple one machine will tend to carry more load than the other. Under these conditions changing the field excitation has little or no effect on the division of the load between the two machines and tends merely to cause leading and lagging currents.

In order to overcome the difficulties above set forth I provide means whereby the phases of the currents supplied to the motors of the motor generator sets may be shifted. By utilizing this means to shift the phases of the electromotive forces impressed upon the motor of one of the motor generator sets, the load of this set may be adjusted so as to form a proper proportion of the total load carried by the two or more sets.

The novel features of the invention I have pointed out with particularity in the appended claims.

The invention itself, however, both as to its embodiment and mode of operation, will be better understood by reference to the following description taken in connection with the accompanying drawings, in which Figure 1 represents a system embodying my invention, and Fig. 2 a modification.

In Fig. 1 the alternating current supply mains are indicated at 1, 2 and 3, and being three in number are intended to convey the usual three-phase high potential alternating current. The motor-generator sets which receive current from these transmission lines and which are to be run in multiple with each other are indicated at 4 and 5. The motor of set 4 is indicated at 6 and the generator at 7, while in the case of set 5 the motor is indicated at 8 and the generator at 9.

The conditions which require the use of such motor generator sets are generally such as involve the transformation of alternating current of one frequency into current of another frequency, as for example, the transformation of current of 25 cycles, suitable for power purposes, into 60 cycle current, suitable for lighting. Where the motor generator sets are direct connected the number of poles of the respective machines are in the ratio of 25 to 60. It will therefore be evident that a phase displacement of the 25 cycle machine, even if of only a few degrees, will correspond approximately to a two and one-half times greater phase displacement on the 60 cycle generator.

In order to divide the load properly between the generators of the motor generator sets, it is therefore evident that only a small phase displacement is necessary on the motor sides of the sets. I provide means, however, for producing any desired shifting in phase on the motor sides of the sets, either large or small, in order to secure the desired results. This means, as shown, consists of taps on the transformers which supply the motor generator sets, which taps, as the connections thereto are shifted, enable the phases of the currents likewise to be shifted.

In Fig. 1 the primary windings of a three-phase connected set of single phase transformers or of a single three-phase transformer, are indicated at 10, 11 and 12, and the corresponding secondaries at 13, 14 and 15. The sets of windings are shown as connected in delta relation to each other. The secondary windings are provided, near their junction points, with a series of taps to which connections may be made to the supply leads 16, 17 and 18 of the motors by means of corresponding switch arms, or other suitable devices 19, 20 and 21. In the case of the motor generator set 4, these switches are arranged so as to connect the leads 16, 17 and 18 to the junction between the respective coils 13, 14 and 15.

The motor generator set 5 is supplied with current from the three-phase transformer windings 22, 23 and 24. These windings are the same as the windings 13, 14 and 15 already described, and the tap connections are likewise the same. The leads 25, 26 and 27, however, are shown as connected by switches, not to the junction between the windings, but to taps displaced from the terminals of the winding. This has the effect of impressing upon the motor generator set voltages, the phases and magnitudes of which are indicated by the dotted triangle 28. The phase of these voltages, it will be seen, are shifted slightly from the corresponding phases of the windings themselves, and if desired may be shifted still more by shifting the points of connection farther away from the terminals of the coils. By thus shifting the connections of the leads 25, 26 and 27 to one side or the other of the respective junction points, the electromotive forces impressed upon the motor 8 may be advanced or retarded in phase, as the case may be, until the load taken by the motor-generator set bears a proper proportion of the total load carried by all of the sets.

It will be noted that in the case just described the voltages, as their phases are shifted from the normal voltage of the transformer secondaries, decrease in value. I may, however, if desired, arrange the connections so as to produce an increase in value as well as a decrease. Thus in Fig. 2, which in all other respects is intended, as far as it goes, to be the same as Fig. 1, the transformer secondaries 29, 30 and 31 are provided respectively with extensions of the main windings indicated at 32, 33 and 34. These extensions, as well as adjacent points of the corresponding main windings, are provided with taps, so that the leads conveying current from the windings may be connected either to the extensions or to portions of the main windings near their points of junction with each other. When the leads are connected to the extensions the voltages, in magnitude and phase, are represented, in the case of connection to one set of taps, by the dotted triangle 35, while by way of contrast the voltages corresponding to connections to points in the main windings are represented by the dotted triangle 36. The voltages, when connection is made to the extensions are greater in magnitude than the voltages made to points in the main windings. By choosing connections between one extreme and the other a considerable variation in phase and magnitude of the voltages may be secured, and thereby provide adjusting means for any probable requirements in connection with load equalization.

What I claim as new and desire to secure by Letters Patent of the United States, is:

1. The combination of an alternating current supply system, a plurality of sets of motor-generators, transformers between said sets and said supply system, and means for shifting the connections of at least one of said motor generators with the transformer from which it receives current.

2. The combination of a transformer, a motor-generator set consisting of a synchronous motor coupled to an alternating current generator, connections between said synchronous motor and said transformer, and means for shifting the phase of the voltage supplied from said transformer to said synchronous motor.

3. The combination of a transformer, a synchronous motor, an alternating current generator driven thereby, and phase shifting connections between said motor and said transformer.

4. The combination of transformer windings, a plurality of taps extending from each winding, a plurality of related dynamo electric machines, and leads extending from one of said machines and adapted to be connected to said windings in a plurality of phase differing relations.

5. The combination of an alternating current supply system, a plurality of synchronous motor generators, and means for adjusting the phase of at least one of said motor generators with respect to another of said motor generators.

6. The combination of an alternating current supply system, dynamo electric machines driven therefrom in synchronism, and means for adjusting the phase of one machine with respect to another.

7. The combination of an alternating current supply system, a plurality of dynamo machines for transforming current from said system, said dynamo machines operating to feed the transformed current to a common receiving circuit, and means for adjusting the ratio between the loads taken by said machines.

In witness whereof I have hereunto set my hand this tenth day of October, 1904.

JOHN B. TAYLOR.

Witnesses:
 EDWARD WILLIAMS, Jr.,
 HELEN ORFORD.